(12) United States Patent
Hyun

(10) Patent No.: US 7,780,105 B2
(45) Date of Patent: Aug. 24, 2010

(54) BACKLASH PREVENTION APPARATUS FOR BAIT REEL

(75) Inventor: Kwang Ho Hyun, Buchun (KR)

(73) Assignee: Doyo Engineering Co., Ltd. (KR)

( * ) Notice: Subject to any disclaimer, the term of this patent is extended or adjusted under 35 U.S.C. 154(b) by 0 days.

(21) Appl. No.: 12/437,721

(22) Filed: May 8, 2009

(65) Prior Publication Data

US 2009/0277985 A1    Nov. 12, 2009

(30) Foreign Application Priority Data

May 8, 2008    (KR) .................. 20-2008-0006065 U

(51) Int. Cl.
*A01K 89/01*    (2006.01)
(52) U.S. Cl. .................... 242/289; 188/181 A
(58) Field of Classification Search .............. 242/289; 188/181 A, 185
See application file for complete search history.

(56) References Cited

U.S. PATENT DOCUMENTS

| | | | | |
|---|---|---|---|---|
| 6,435,438 B1 * | 8/2002 | Hyon | ......................... | 242/289 |
| 6,481,657 B1 * | 11/2002 | Oishi et al. | ................. | 242/289 |
| 6,955,315 B2 * | 10/2005 | Hyun | ......................... | 242/289 |
| 6,957,787 B1 * | 10/2005 | Rho | ......................... | 242/289 |
| 6,959,886 B1 * | 11/2005 | Rho | ......................... | 242/289 |
| 6,966,517 B2 * | 11/2005 | Seo | ......................... | 242/289 |
| 7,374,120 B2 * | 5/2008 | Hyun | ......................... | 242/289 |
| 7,618,003 B2 * | 11/2009 | Rho | ......................... | 242/288 |
| 2006/0060687 A1 * | 3/2006 | Lee | ......................... | 242/289 |

* cited by examiner

*Primary Examiner*—Emmanuel M Marcelo
(74) *Attorney, Agent, or Firm*—Park & Associates IP Law LLC

(57) ABSTRACT

A backlash prevention apparatus for a bait reel is provided. The apparatus can stepwise control a braking power of a spool according to a user's request by stepwise releasing restraint of first to eighth brake shoes that generate a friction force by manipulating a control dial installed in a side cover.

8 Claims, 16 Drawing Sheets

BACKLASH PREVENTION APPARATUS FOR BAIT REEL

FIELD OF THE INVENTION

The present patent or utility model relates to a backlash prevention apparatus for a bait reel. More particularly, the present utility model relates to a backlash prevention apparatus for a bait reel, for stepwise and minutely controlling a rotation of a spool outside without opening a side cover.

BACKGROUND OF THE INVENTION

As well known in the art, a bait reel includes a reel frame, a spool rotatably mounted in the reel frame and winding a fishing line, a handle installed at one side surface of the reel frame and rotation-driving the spool, and a side cover coupled to an opposite side surface of the reel frame.

A backlash prevention apparatus is included and installed within the side cover. The backlash prevention apparatus is an apparatus prepared for controlling a rotation of the spool rotating at a high speed in a process of casting a lure, a bait, etc., thus preventing a fishing line from being excessively undone and getting entangled with the spool.

As the conventional art related with the backlash prevention apparatus, three methods can be exemplified as follows.

The first is a method of braking a spool by generating a friction of a brake shoe using the centrifugal force. This method is troublesome because having to inevitably separate a side cover to change a braking power in the spool during fishing and also, has a problem that the separated side cover may be lost or destroyed.

The second is a method of adjusting a position of a brake ring triggering a friction with a brake shoe without adjusting the brake shoe such that it can apply a braking power to a spool without separating a side cover. In this method, a space of the side cover is limited and thus, there is a problem of not being capable of differentially controlling a braking power of the spool through several steps.

The third is a method of applying a braking power to a spool that uses a magnetic force, without separating a side cover. This method has a problem that, when a high braking power is given to the spool, a rotation of a handle gets heavy by a magnetic force even in a state of winding a fishing line not casting.

SUMMARY OF THE INVENTION

An aspect of exemplary embodiments of the present patent (utility model) is to address at least the problems and/or disadvantages and to provide at least the advantages described below. Accordingly, an aspect of exemplary embodiments of the present utility model is to provide a backlash prevention apparatus for a bait reel, for stepwise controlling a braking power of a spool using a control dial installed in a side cover, without separating the side cover.

According to one aspect of the present utility model, an externally controllable backlash prevention apparatus for a bait reel comprised of a spool and a side cover is provided. The apparatus includes a manipulation means, a brake holder, a brake ring, first to eighth brake shoes, springs, first to eighth catch jaws, a brake shoe dial, and a braking means. The manipulation means is installed between the spool and the side cover. The brake holder is coupled to a shaft of the spool and receives a delivery of a power of the manipulation means for rotation operation. The brake ring is assembled to an outer surface of the brake holder in a state of being at a distance. The first to eighth brake shoes are installed in a state of being spread radially along one side circumference surface of the brake holder, move in an outer direction by the centrifugal force depending on a rotation of the spool, contact with an inner circumference surface of the brake ring, and generate a friction force. The springs are installed within the first to eighth brake shoes and restore, by a tension force, the first to eighth brake shoes to the original state. The first to eighth catch jaws are protrusion-formed in positions different from each other on one side surfaces of the first to eighth brake shoes, respectively. The brake shoe dial is covered with the first to eighth brake shoes and receives a delivery of a rotary force of the plate holder for rotation-operation. The braking means is comprised of first to eighth protrusion rims each protrusion-formed in positions different from each other along one side circumference surface of the brake shoe dial, being sequentially detached from the first to eighth catch jaws according to rotation-driving of the brake shoe dial in a state of being each caught by outer surfaces of the first to eighth catch jaws, and stepwise releasing restraint of the first to eighth brake shoes.

According to another aspect of the present utility model, the manipulation means includes a dial cover, a control dial, a dial gear, a plate holder, a cap, a cap holder, and a pin. The dial cover is hinge-coupled to one side surface of the side cover for rotation operation and protrusion-forms a press jaw on an inner surface. The control dial is covered with the dial cover and is rotatably fitted into a coupling hole formed at one side of the side cover. The dial gear is coupled to an outer diameter of the control dial. The plate holder is installed between the spool and the side cover, forms a ring gear engaged with the dial gear at an outer diameter, and rotation-operates by an operation of the control dial. The cap is coupled to a center of the plate holder. The cap holder is positioned on one surface of the cap, is pressed by a press jaw of the dial cover according to a rotation of the dial cover, and moves the cap and the plate holder in one side direction. The pin is provided outside of the plate holder, is fitted into a groove formed on one side outer surface of the brake shoe dial according to a movement of the plate holder, and delivers a rotary force of the plate holder to the brake shoe dial.

According to a further aspect of the present utility model, the manipulation means includes a control dial, a press button, a plate holder, a cap, a cap holder, and a pin. The control dial is rotatably fitted into a coupling hole formed at an outside of the side cover, through-forms a hole at a center, and coupling-constructs a dial gear at an outer diameter. The press button is fitted into the hole of the control dial and rotating-drives the control dial. The plate holder is installed between the spool and the side cover, forms a ring gear engaged with the dial gear, and rotation-drives by an operation of the control dial. The cap is coupled to a center of the plate holder. The cap holder is positioned on one surface of the cap, extension-forms a flat part contacting with the press button at one side, and moves the cap and the plate holder in one side direction by a press pressure of the press button. The pin is provided outside of the plate holder, is fitted into a groove formed on one side outer surface of the brake shoe dial according to a movement of the plate holder, and delivers a rotary force of the plate holder to the brake shoe dial.

According to a yet another aspect of the present utility model, the manipulation means includes a control dial, a press button, a connection gear, a plate holder, a cap, a cap holder, and a pin. The control dial is rotatably fitted into a coupling hole formed at a center of the side cover, through-forms a hole at a center, and coupling-constructs a dial gear at an outer diameter. The press button is fitted into the hole of the control dial and rotation-drives the control dial. The connection gear is coupled to a shaft installed at one side of the brake ring and engaging with the dial gear. The plate holder is installed between the spool and the side cover, forms a ring gear engaged with the connection gear at an outer diameter, and rotation-drives by an operation of the control dial. The cap is coupled to a center of the plate holder. The cap holder is positioned at one surface of the cap, and moves the cap and the plate holder in one side direction by a press pressure of the press button. The pin is provided outside of the plate holder, is fitted into a groove formed on one side outer surface of the brake shoe dial according to a movement of the plate holder, and delivers a rotary force of the plate holder to the brake shoe dial.

BRIEF DESCRIPTION OF THE DRAWINGS

The above and other objects, features and advantages of the present utility model will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present utility model will now be described in detail with reference to the annexed drawings.

Figure 1:
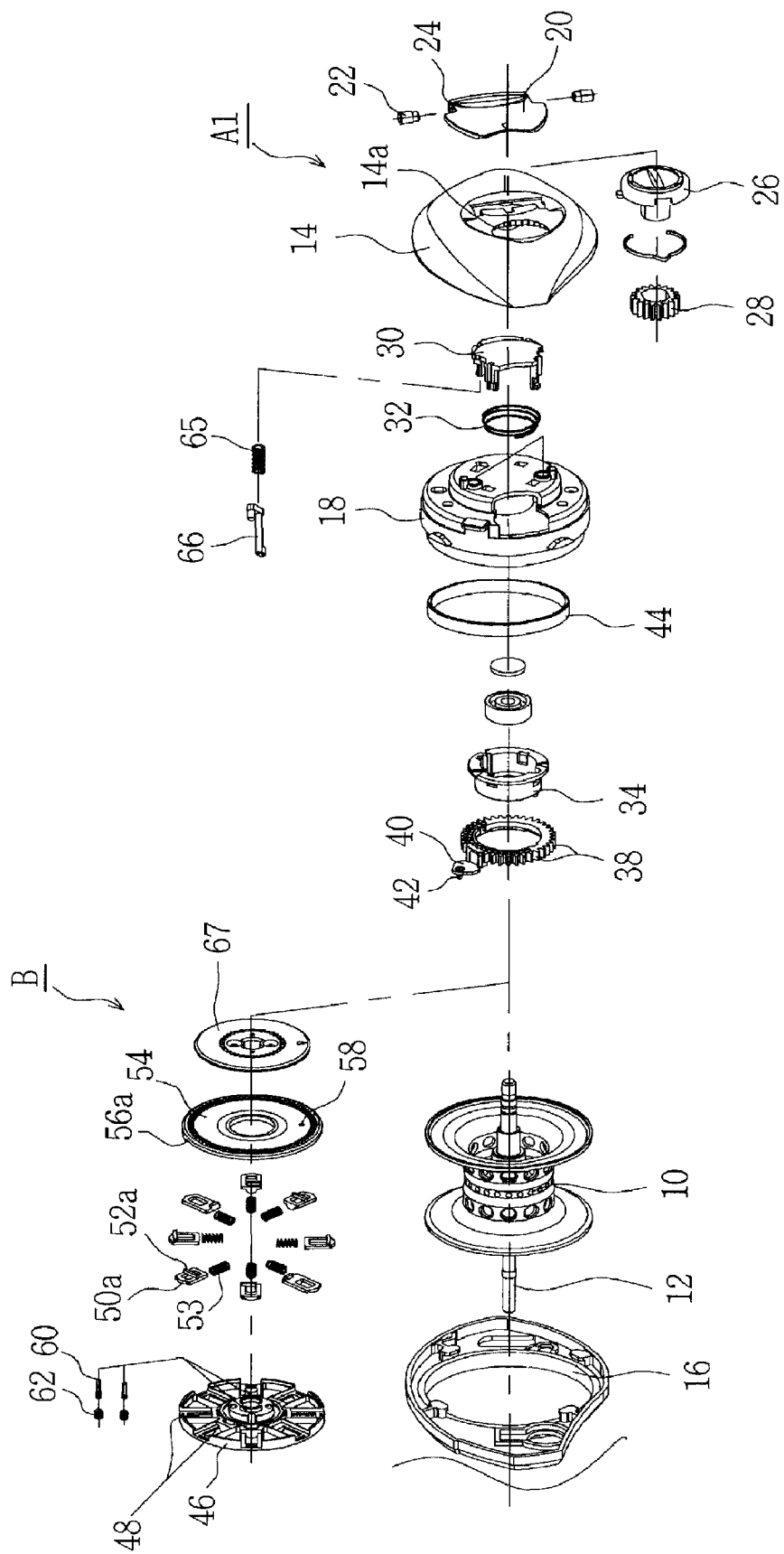
FIG. 1 is a diagram illustrating a construction of a backlash prevention apparatus for a bait reel according to a first exemplary embodiment of the present utility model.
Figure 2:
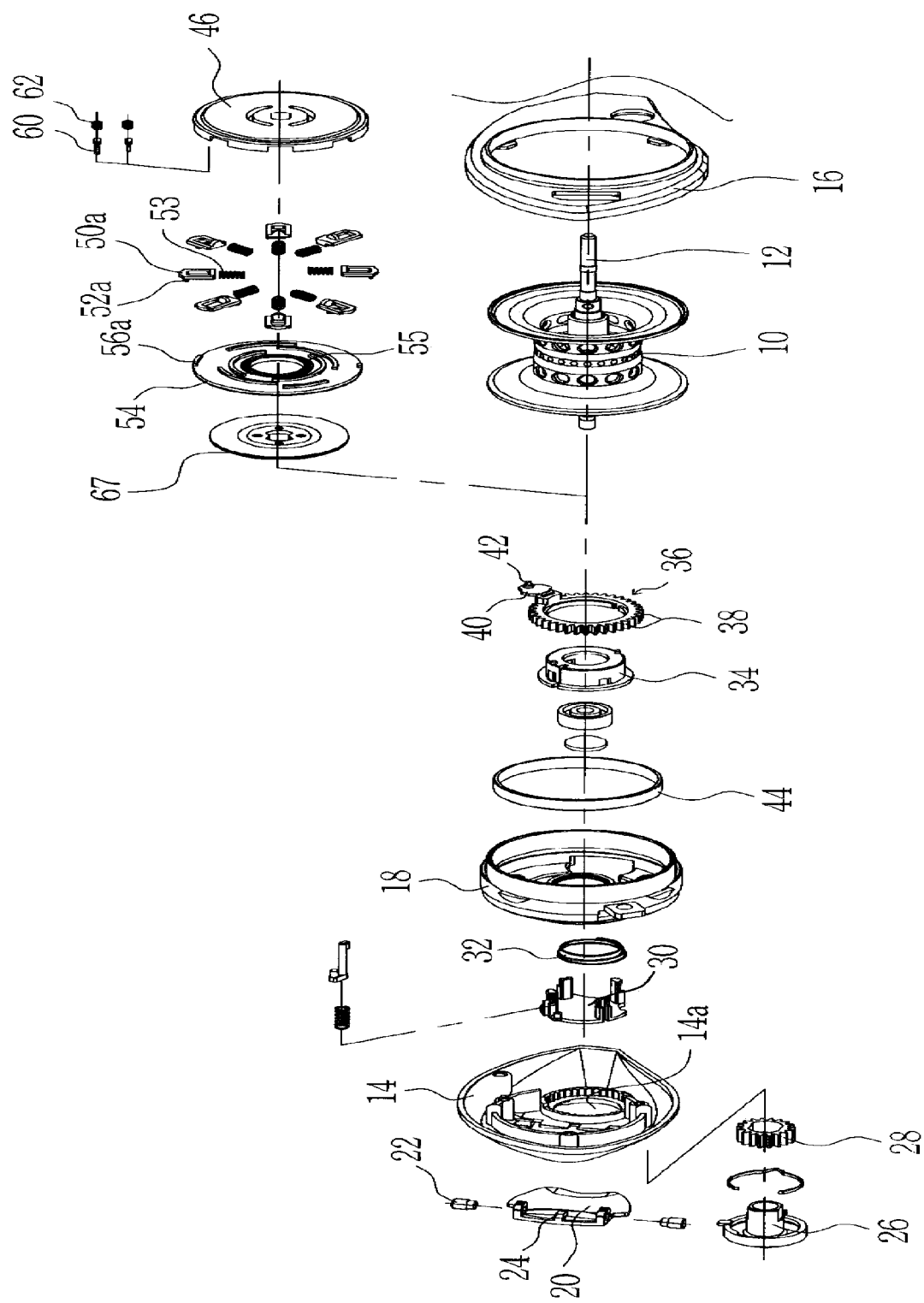
FIG. 2 is a diagram illustrating a bottom surface of a construction of the backlash prevention apparatus for the bait reel shown in FIG. 1.
Figure 3:
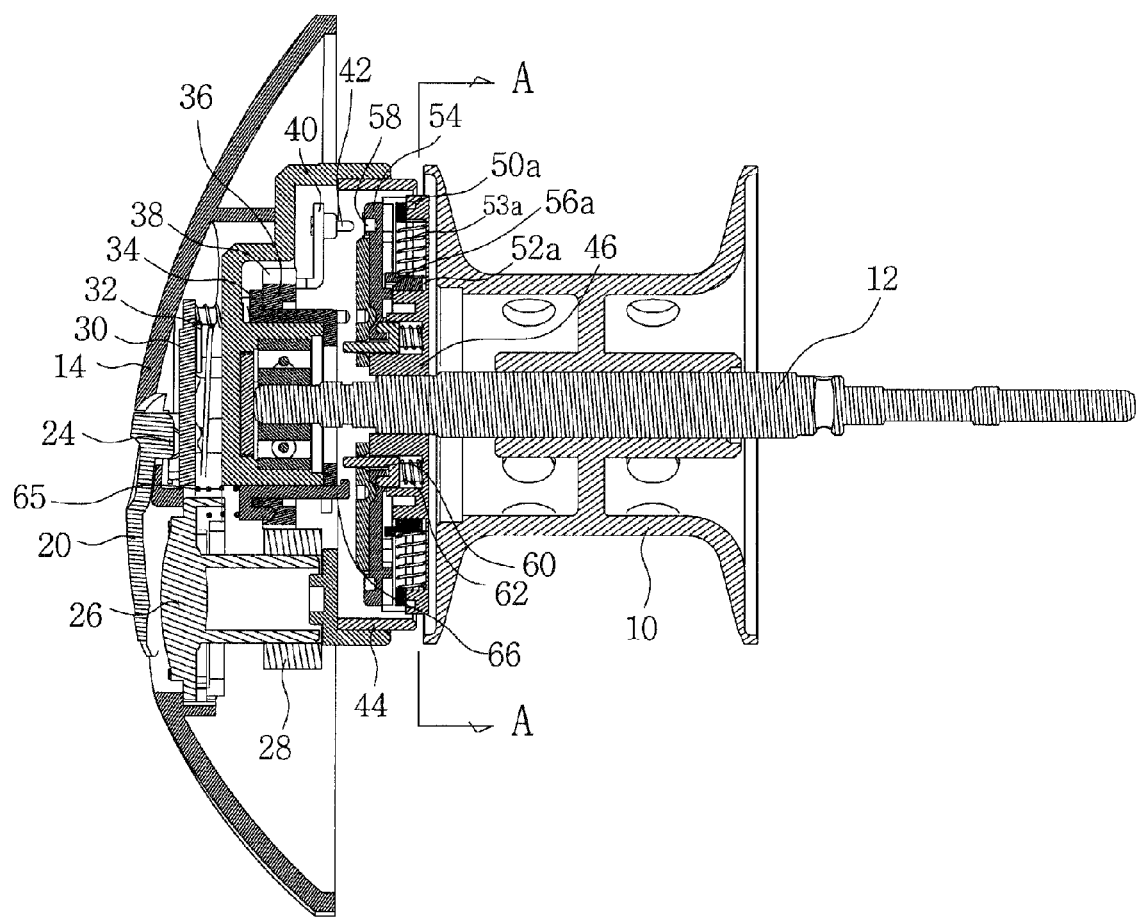
FIG. 3 is a diagram illustrating a section of an assembly construction of a backlash prevention apparatus for a bait reel according to the present utility model.

FIGS. 2 and 3 attached are diagrams illustrating the whole construction of a backlash prevention apparatus for a bait reel according to a first exemplary embodiment of the present utility model.

As illustrated, a bait reel includes a spool 10 on which a fishing line is wound and a center of which a shaft 12 is installed through, a side cover 14 covered at one side of the spool 10, a reel frame 16 covered at the other side of the spool 10, and a handle (not shown) coupled to the shaft 12 of the spool 10 and rotation-operating the spool 10.

The bait reel includes and installs a backlash prevention apparatus that is a means for stepwise controlling a rotary force of the spool 10.

The backlash prevention apparatus is mainly divided into and comprised of a manipulation means (A1) and a braking means (B).

The manipulation means (A1), a means for manipulating to stepwise control a rotary force of the braking means (B), includes a dial cover 20, a control dial 26, a cap holder 30, and a plate holder 36.

The dial cover 20 is coupled by a hinge 22 to one side surface of the side cover 14 and is rotated with centering on the hinge 22 and exposes the control dial 26 installed within the side cover 14.

A press jaw 24 is protrudingly formed at the other end of the dial cover 20. The press jaw 24 presses the cap holder 30 in a rotation process of the dial cover 20.

Figure 6:
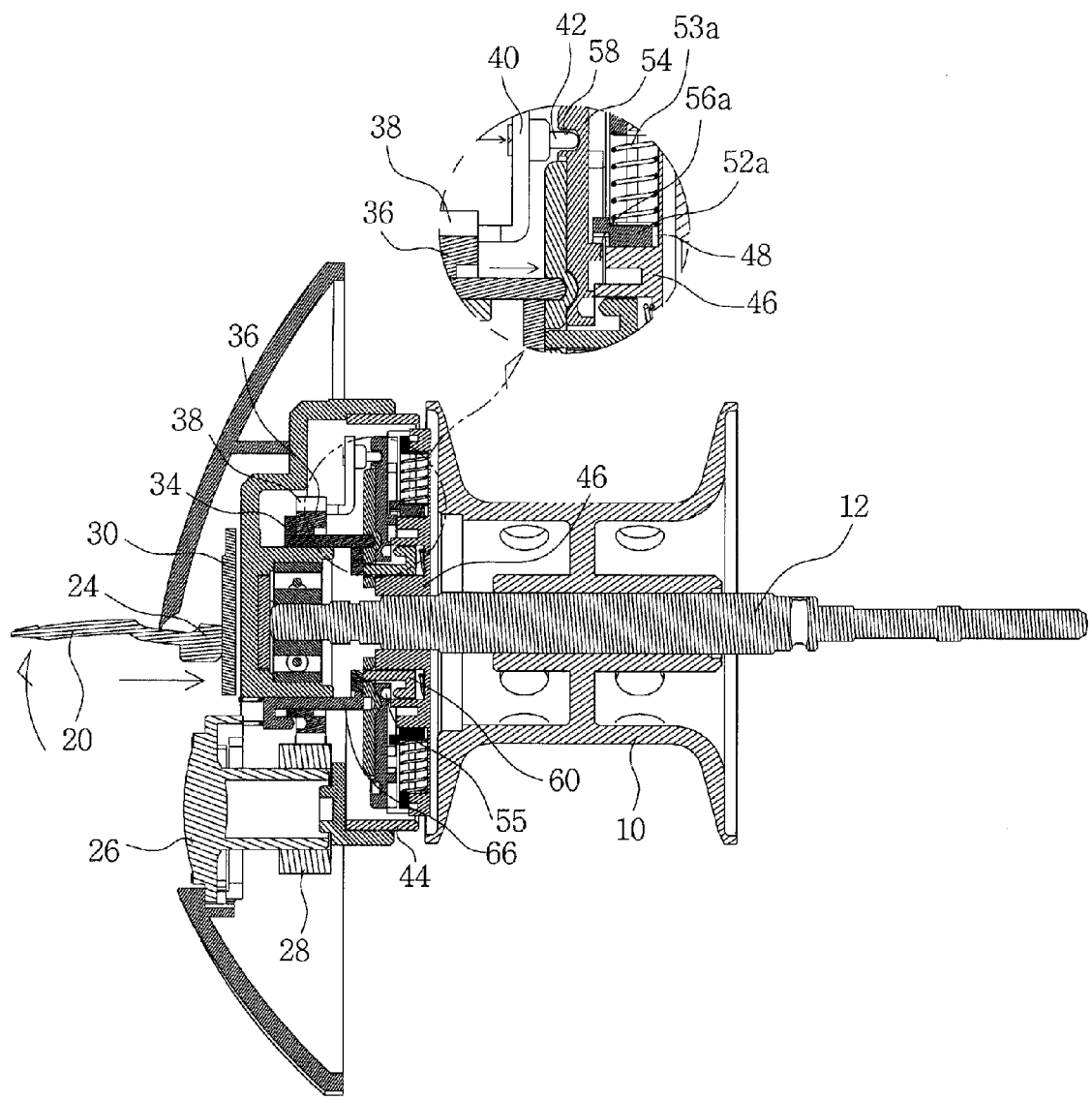
FIG. 6 is a diagram illustrating an operation state of a manipulation means in a backlash prevention apparatus for a bait reel according to a first exemplary embodiment of the present utility model.

In an exemplary embodiment of the present utility model, as shown in FIG. 6, the press jaw 24 is manufactured in a squared sectional shape such that a contact surface of the press jaw 24 contacting with the cap holder 30 by a rotational operation of the dial cover 20 has a flat terminal end. With this construction, the rotatable dial cover 20 can stand at right angle perpendicularly on the cap holder 30 and maintains the perpendicularly standing state as long as an external force is not applied thereto.

Figure 10:
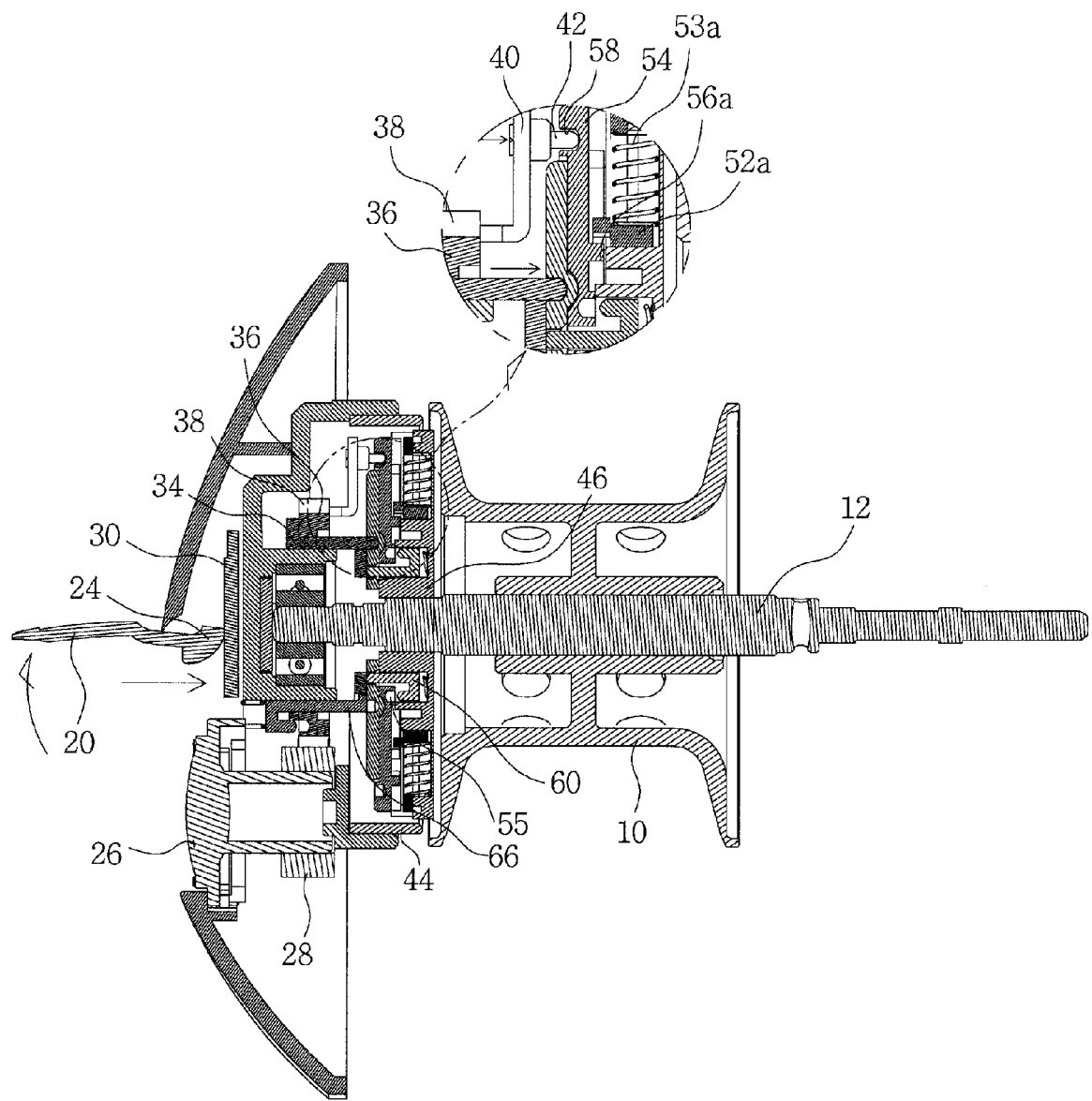
FIG. 10 is a diagram illustrating a different implementation form of a press button shown in FIG. 6.

In a different exemplary embodiment of the present utility model, as shown in FIG. 10, the press jaw 24 is manufactured in an oval sectional shape such that a contact surface of the press jaw 24 contacting with the cap holder 30 by a rotational operation of the dial cover 20 has a round terminal end. With this construction, the rotatable dial cover 20 can stand at right angle perpendicularly on the cap holder 30. However, in this embodiment, although an external force is not applied, the dial cover 20 can be automatically returned to a closed position, due to the round contact surface, when a user detaches his/her hand holding the dial cover 20.

Meantime, the control dial 26 is rotatably fitted into a coupling hole 14a of the side cover 14 and stepwise controls the braking means (B) controlling a rotation of the spool 10. In the present utility model, it is constructed to control a braking power of the control dial 26 through eight steps.

A dial gear 28 is coupled to an outer diameter of the control dial 26. The dial gear 28 is engaged with a ring gear 38 formed on an outer circumference surface of the plate holder 36 and forwards a rotary force of the control dial 26 to the plate holder 36.

The cap holder 30 is coupled to the cap 34 fitted into a center of the plate holder 36 in a state of passing through a spool cover 18 installed between the spool 10 and the side cover 14. The cap holder 30 is pushed by a press pressure of the press jaw 24 according to a rotation of the aforementioned dial cover 20, and moves the cap 34 and the plate holder 36 in one side direction. A spring 32 is installed between the cap holder 30 and the cap 34. The spring 32 restores the cap holder 30, a cap 34, and the plate holder 36 to the original state at the same time of press release of the press jaw 24.

The plate holder 36 receives a delivery of a rotary force of the control dial 26 and stepwise rotates a brake shoe dial 54.

A combination structure between the plate holder 36 and the control dial 26 is constructed to deliver the rotary force of the control dial 26 to the plate holder 36 by coupling the dial gear 28 to an outer diameter of the control dial 26 and engaging the ring gear 38 and the dial gear 28 with each other in a state of integrally forming the ring gear 38 on an outer circumference surface of the plate holder 36.

An arm 40 is extension-formed on an outer surface of the plate holder 36, and a pin 42 is coupled to an end of the arm 40. The pin 42 is fitted into a groove 58 depression-formed on one side outer surface of the brake shoe dial 54 constituting the braking means and stepwise rotates the brake shoe dial 54 according to a rotation of the plate holder 36. The pin 42 is not in a state of being always fitted into the groove 58 of the brake shoe holder 54 but is constructed to be selectively fitted into the groove 58 of the brake shoe dial 54 only when the plate holder 36 moves to one side by a press pressure of the press jaw 24 pressing the cap holder 30.

Construction is such that one end of a stopper 66 is coupled to one side of the plate holder 36 and the other end of the stopper 66 presses a brake holder cover 67 described later according to one side direction movement of the plate holder 36. At this time, the one end of the stopper 66 is constructed to be detached from the plate holder 36 at the same time of a movement of the plate holder 36. Also, a spring 65 is installed between the stopper 66 and the control dial 26 to elastically support a movement of the stopper 66.

Meantime, the braking means (B) is a means for stepwise generating a braking power depending on a control operation of the manipulation means (A1), and includes a brake ring 44, a brake holder 46, and the brake shoe holder 54.

The brake ring 44 is assembled to an inner surface of a spool cover 18 installed between the spool 10 and the side cover 14 in a ring form and is selectively rubbed with first to eighth brake shoes 50a to 50h described later and generates a braking power.

The brake holder 46 is a means coupled to a shaft 12 of the spool 10 and rotation-operating by a rotary force of the spool 10.

Figure 4:
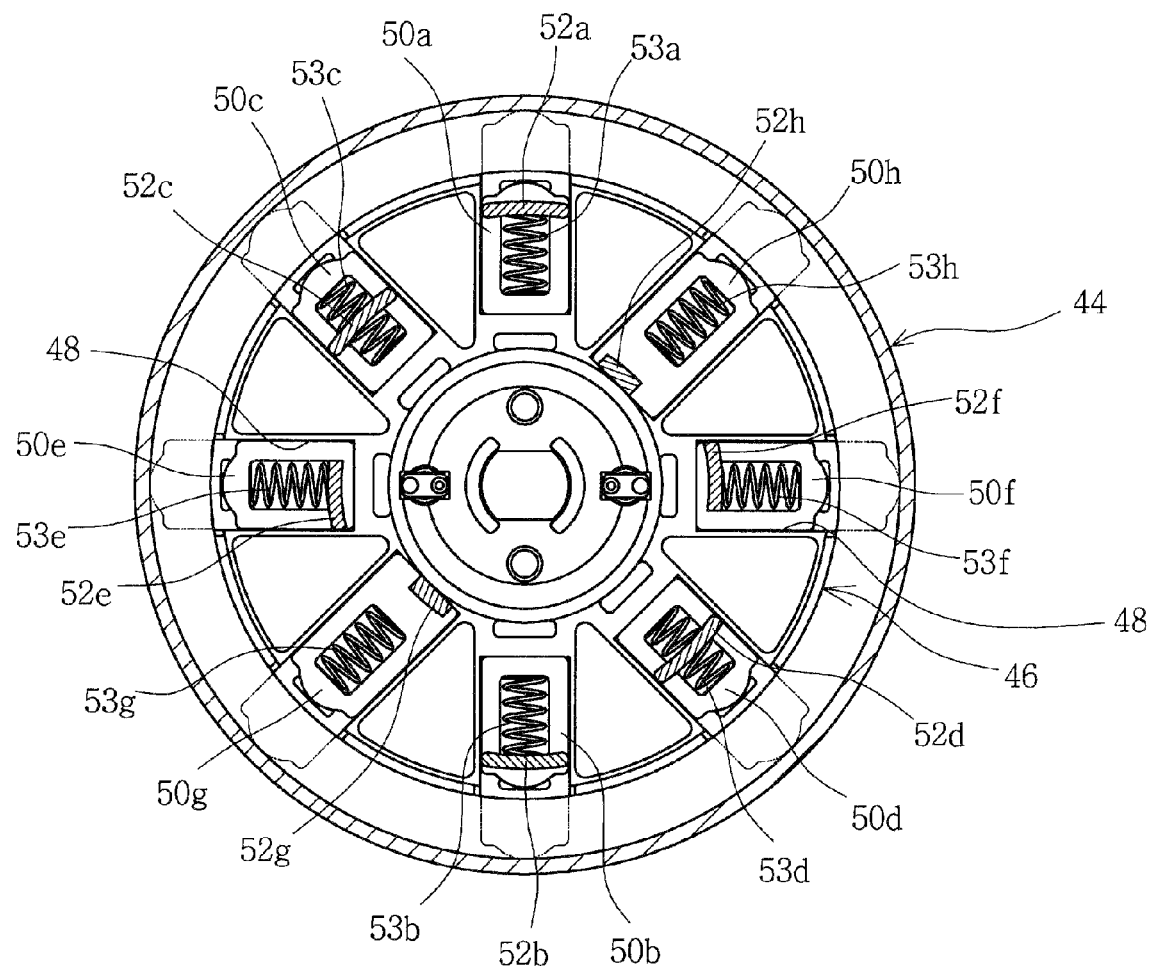
FIG. 4 is a diagram illustrating a plane of a brake holder shown in FIGS. 1 and 2.

FIG. 4 is a diagram illustrating the brake holder 46 taken apart from the apparatus. As illustrated, the brake holder 46 is of a disk form with divisions formed in a state where a plurality of insert portions 48 are provided radially on one side circumference surface thereof. The first to eighth brake shoes 50a to 50h are each inserted into the insert portions 48.

In a state where the first to eighth brake shoes 50a to 50h each are inserted into the insert portions 48 of the brake holder 46, when the brake holder 46 rotates by driving of the spool 10, the first to eighth brake shoes 50a to 50h move in an outside direction by the centrifugal force and generate a friction force in a state of contacting with an inner circumference surface of the aforementioned brake ring 44, thus applying braking to the spool.

Springs 53a to 53h elastically supporting an outside direction movement of the first to eighth brake shoes 50a to 50h are fitted into centers of the first to eighth brake shoes 50a to 50h.

First to eighth catch jaws 52a to 52h are protrusion-formed on one-surfaces of the first to eighth brake shoes 50a to 50h. The first to eighth catch jaws 52a to 52h are each selectively caught by first to eight protrusion rims 56a to 56h formed along one side circumference surface of the brake shoe dial 54 described later, restrict an outside direction movement of the first to eighth brake shoes 50a to 50h, and control a braking power depending on friction.

The first to eighth catch jaws 52a to 52h are each protrusion-formed and constructed on one-side surfaces of the first to eighth brake shoes 50a to 50h and are desirably constructed to be formed in positions different from each other. In detail, the first catch jaw 52a is formed at the outermost side on one side surface of the first brake shoe 50a. The second catch jaw 52b is formed on one side surface of the second brake shoe 50b to be positioned inner than the first catch jaw 52a. The third catch jaw 52c is formed on one surface of the third brake shoe 50c to be positioned inner than the second catch jaw 52b. The remaining fourth to eighth catch jaws 52d to 52h are also constructed to be sequentially formed in positions different from each other on one surface of a corresponding brake shoe in the above manner. By differently constructing the positions of the first to eighth catch jaws 52a to 52h in the first to eighth brake shoes 50a to 50h, the first to eighth protrusion rims 56a to 56h protruding from one surface of the brake shoe dial 54 are sequentially caught by the first to eighth catch jaws 52a to 52h and stepwise control a braking power of the spool 10. Its description is made below in more detail in an operation description below.

The brake shoe dial 54 is covered on the whole surface of the brake holder 46 in which the insert part 48 is formed such that the first to eighth brake shoes 50a to 50h inserted into the insert parts 48 of the brake holder 46 are not detached. A combination structure between the brake shoe dial 54 and the brake holder 46 is such that a plurality of stoppers 60 are installed at a center of a front surface of the brake holder 46, and the stopper 60 is caught by a coupling groove 55 of the brake shoe dial 54 in a state of being elastically supported by the spring 62 and fixes the brake shoe dial 54 on the whole surface of the brake holder 46. Also, the stopper 60 is pushed to one side according to a movement of the aforementioned plate holder 36 and is detached from the coupling groove 55, thus releasing fixation between the brake holder 36 and the brake shoe dial 54.

A brake holder cover 67 with which the aforementioned stopper 66 is contact-constructed is installed on the whole surface of the brake shoe dial 54.

Figure 5:
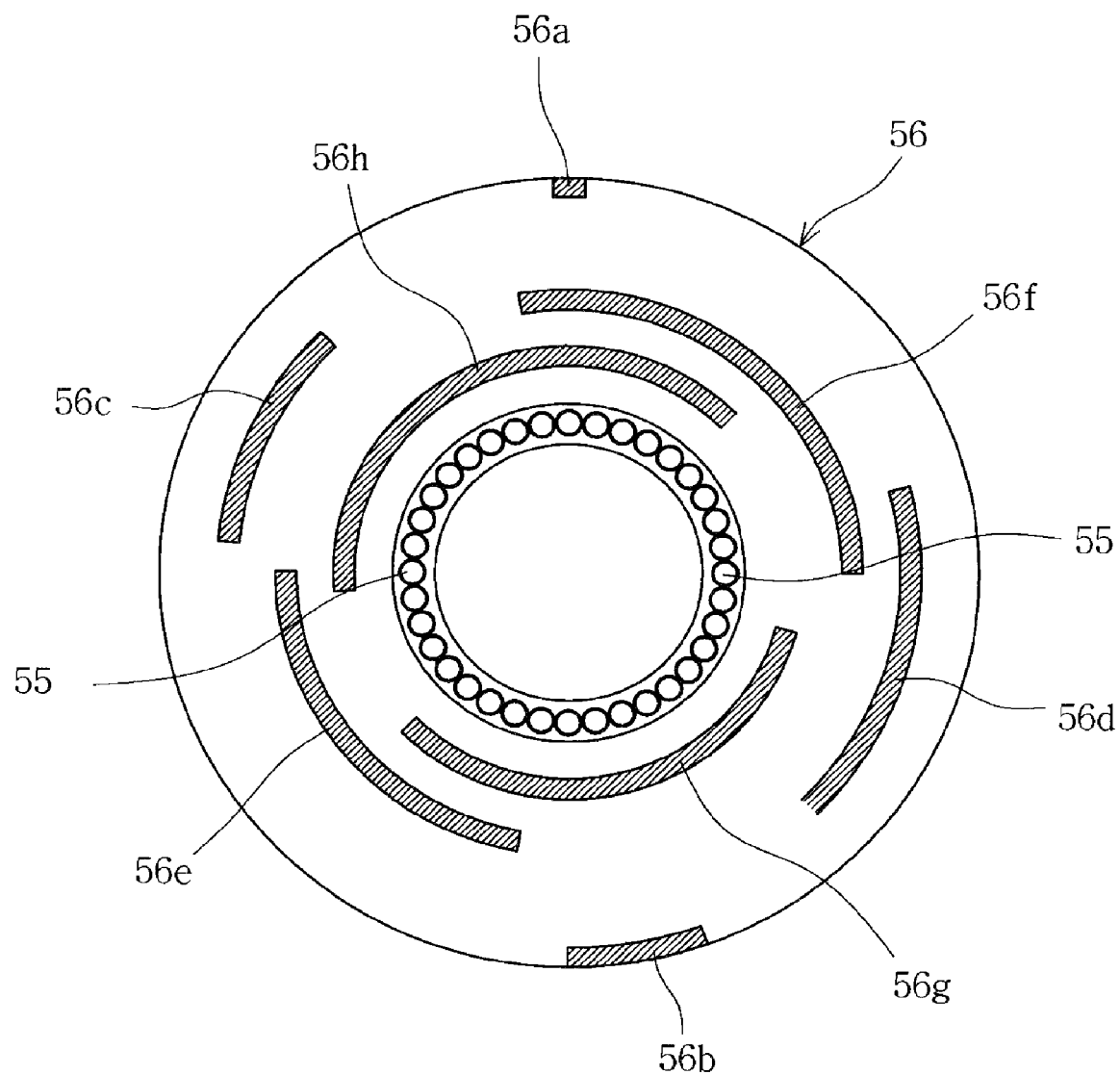
FIG. 5 is a diagram illustrating a plane of a brake shoe dial shown in FIGS. 1 and 2.

FIG. 5 attached is a diagram illustrating a rear surface of the brake shoe dial 54.

As illustrated, the first to eighth protrusion rims 56a to 56h are protrusion-formed on a rear surface of the brake shoe dial 54.

The first to eighth protrusion rims 56a to 56h are formed in different positions on a rear surface of the brake shoe dial 54 such that they are stepwise detached one by one in a state of being each separately caught by the first to eight catch jaws 52a to 52h protrusion-formed at the aforementioned first to eighth brake shoes 50a to 50h and stepwise control a rotary force of the spool 10.

In detail, in a state where the first protrusion rim 56a is formed at a rear surface outside of the brake shoe dial 54 to be caught by an outer surface of the first catch jaw 52a of the first brake shoe 52, if the brake shoe dial 54 is rotated according to manipulation of the control dial 26, the first protrusion rim 56a is detached from the first catch jaw 52a and releases restraint of the first brake shoe 50a. Thus, the first brake shoe 50a moves by the centrifugal force depending on a rotation of the spool 10 and contacts with an inner circumference surface of the brake ring 44, thus generating a braking power of the spool 10.

When a rotary force of the spool 10 increases by one step, if the control dial 26 is again manipulated and rotates the brake shoe dial 54 by a little higher angle, the second protrusion rim 56b caught by an outer surface of the second catch jaw 52b of the second brake shoe 50b can be detached and release restraint of the second brake shoe 50b. Accordingly, the second brake shoe released from restraint moves outside by the centrifugal force according to a rotation of the spool 10 and contacts with an inner circumference surface of the brake ring 44 together with the first brake shoe 50a, thus being able to increase a braking power of the spool 10 by one step.

By continuously manipulating the control dial 26 according to a user's request and stepwise releasing restraint of the third to eighth brake shoes 50c to 50h caught by the third to eighth protrusion rims 56c to 56h as above, the braking power of the spool 10 can be stepwise controlled.

An operation process of the backlash prevention apparatus for the bait reel according to the utility model is described below with reference to FIGS. 6 to 9 attached.

When intending to generate a braking power of the spool 10 during a fishing process, first, if the dial cover 20 is rotated (opened) as in FIG. 6, a press jaw 24 formed at an end of the dial cover 20 presses the cap holder 30. Thus, the cap 34 coupled to the cap holder 30 and the plate holder 36 coupled with the cap 34 are pushed and moved in one direction (in a right direction in the drawing).

At this time, the pin 42 installed in the arm 40 of the plate holder 36 is fitted into the groove 58 formed in one side outer surface of the brake shoe dial 54 according to a movement of the plate holder 36. Also, in a state of being inserted into the coupling groove 55 of the brake shoe dial 54, the stopper 60 installed in the brake holder 46 is pushed according to a movement of the plate holder 36 and the cap 34 and then, is detached from the coupling groove 55 and releases fixation of the plate holder 46 and the brake shoe holder 54.

After that, the control dial 26 exposed from the side cover 14 by an opening operation of the dial cover 20 is manipulated (rotation-operated) and stepwise releases restraint of the first to eighth brake shoes 50a to 50h, thus stepwise controlling a braking power of the spool 10 according to a user's request. Its description is made below in detail with reference to FIGS. 7 to 9 attached.

Figure 7:
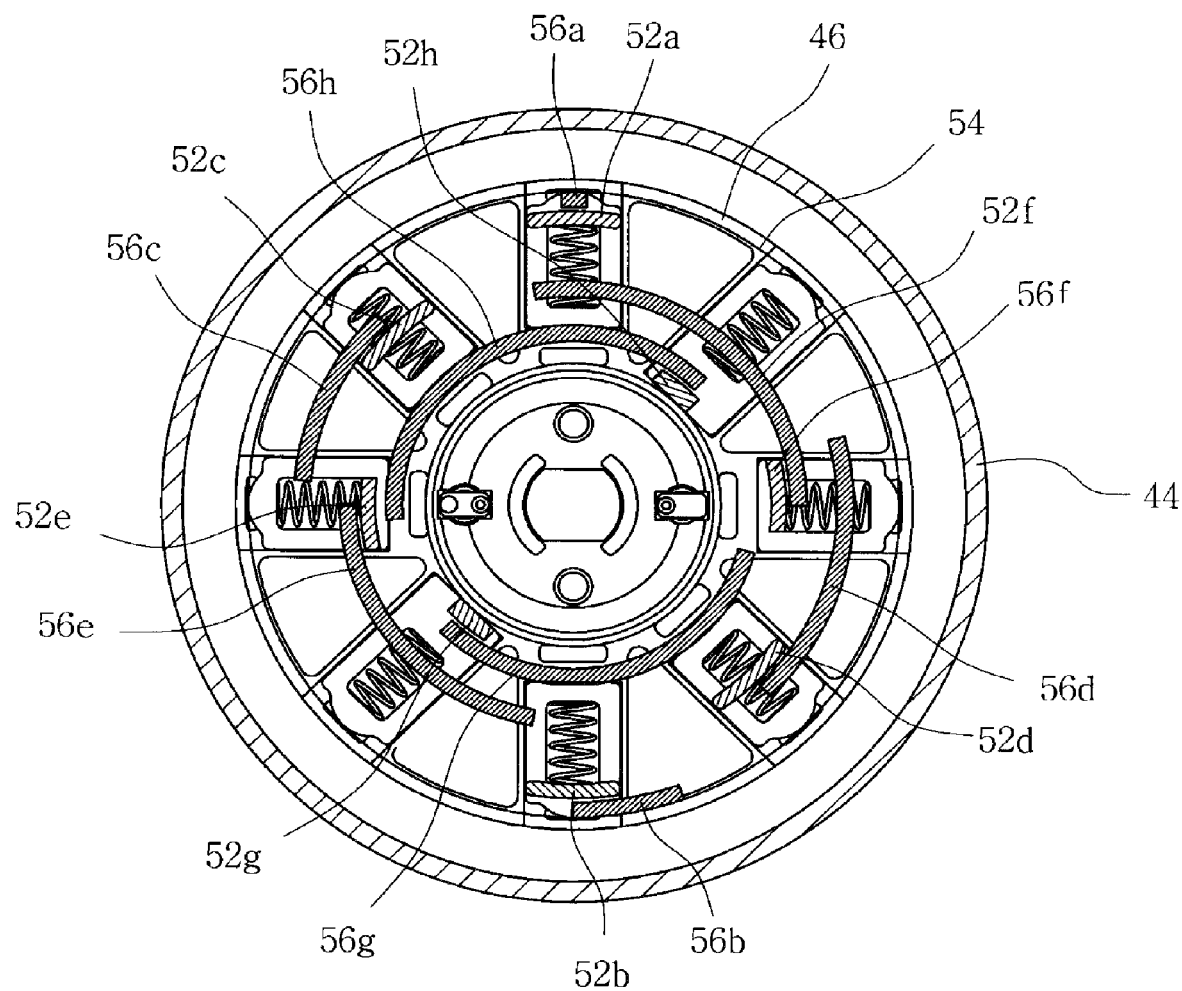
FIGS. 7 to 9 are diagrams sequentially illustrating an operation process of a backlash prevention apparatus for a bait reel according to a first exemplary embodiment of the present utility model.

FIG. 7 attached is a diagram illustrating a state where a braking power of the spool 10 is not generated. First to eighth protrusion rims 56a to 56h formed on a rear surface of the brake shoe dial 54 are each separately caught by outer surfaces of the first to eighth catch jaws 56a to 56h protruding from one side circumference surface of the first to eighth brake shoes 50a to 50h and restrict the first to eighth brake shoes 50a to 50h. thus, although the centrifugal force acts, the first to eighth brake shoes 50a to 50h do not move outside, thus not applying any braking power to the spool 10.

Figure 8:
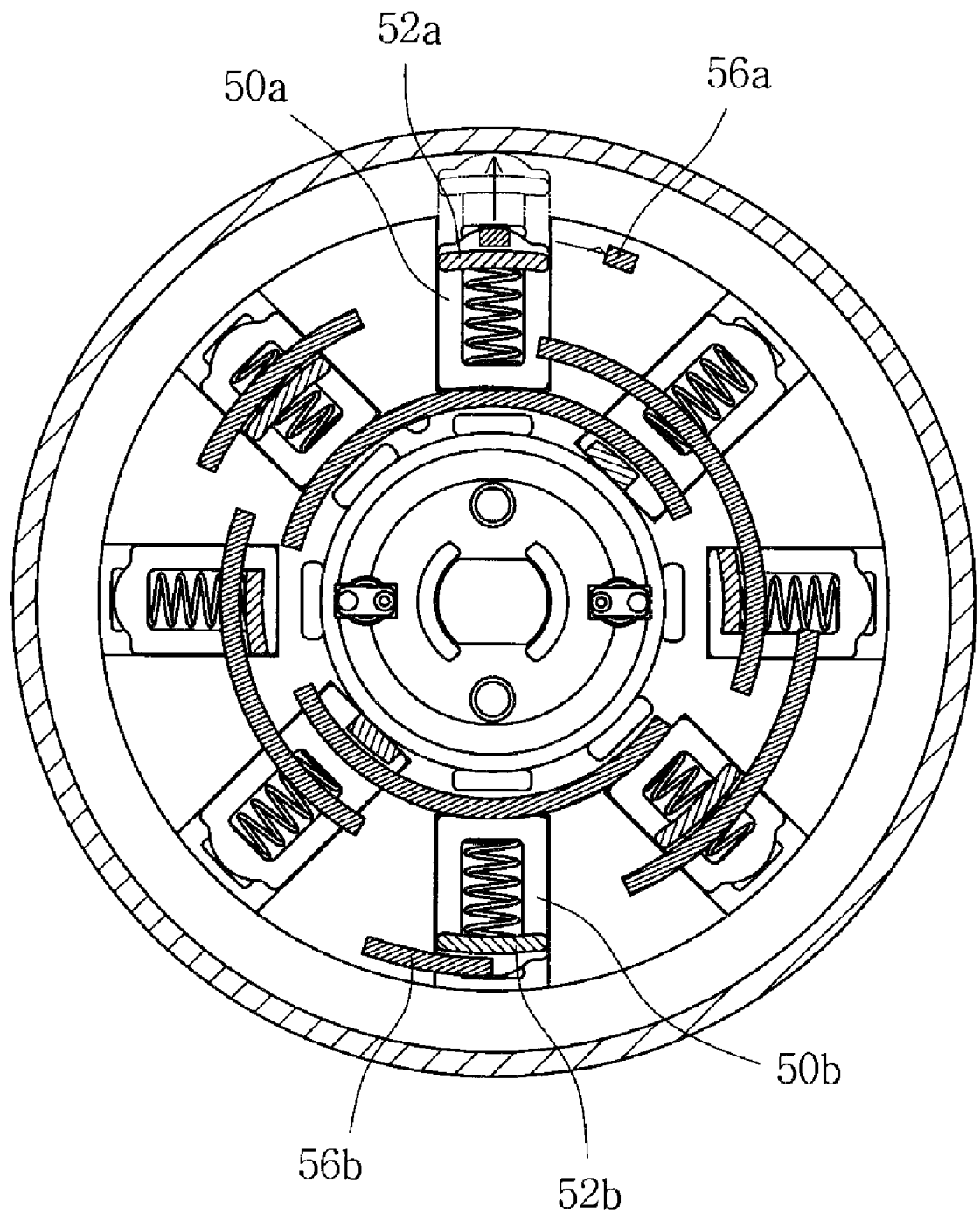

FIG. 8 attached is a diagram illustrating a state of releasing restraint of the first brake shoe 50a and primarily generating a braking power of the spool 10.

As illustrated, if the control dial 26 rotation-operates in one direction (clockwise in the drawing), the plate holder 36 receives a delivery of a rotary force of the control dial 26 through the dial gear 28 and the ring gear 38 and is rotation-driven. Thus, the brake shoe dial 54 connected by the pin 42 with the plate holder 36 is rotation-operated and rotates the first to eighth protrusion rims 56a to 56h.

At this time, among the first to eighth protrusion rims 56a to 56h, the first protrusion rim 56a is detached in a state of being caught by the first catch jaw 52a of the first brake shoe 50a in a process of rotating by driving of the brake shoe dial 54, and releases restraint of the first brake shoe 50a.

If restraint of the first brake shoe 50a is released as above, the first brake shoe 50a moves outside by the centrifugal force of the spool 10 and contacts with an inner circumference surface of the brake ring 44, thereby generating a braking power of the spool 10.

Figure 9:
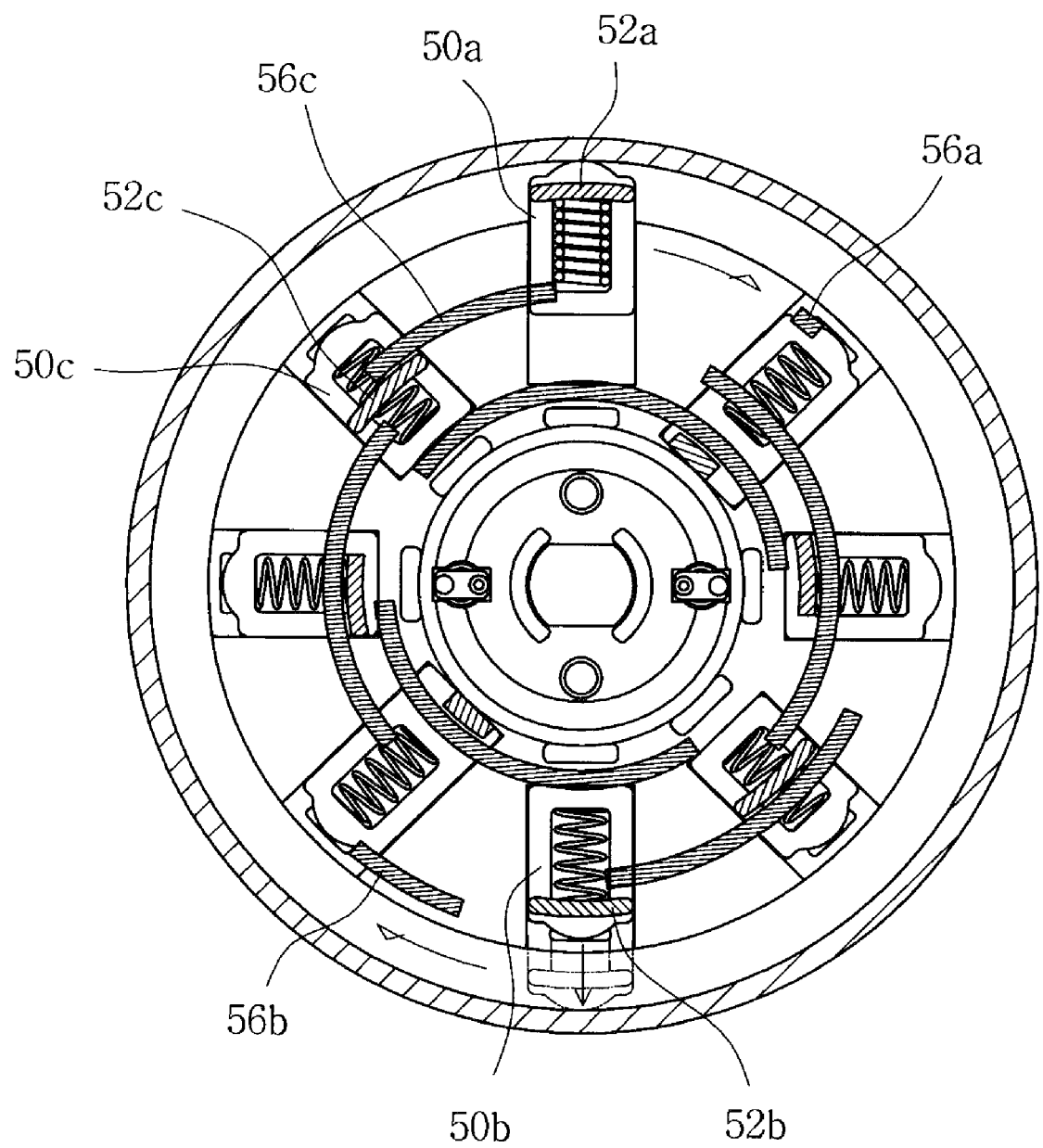

FIG. 9 attached is a diagram illustrating a state of releasing restraint of the first and second brake shoes 50a and 50b and generating a braking power of the spool 10 higher by one step.

As illustrated, if the control dial 26 continuously rotation-operates in one direction in a state of releasing restraint of the first brake shoe 50a, the brake shoe dial 54 is rotated by a higher angle. At this time, the second protrusion rim 56b is detached in a state of being caught by the second catch jaw 52b of the second brake shoe 50b and releases restraint of the second brake shoe 50b. Thus, if the centrifugal force of the spool 10 acts, the first and second brake shoes 50a and 50b simultaneously move outside and each contact with the inner circumference surface of the brake ring 44, thereby being able to generate a braking power of the spool 10 increasing by one step.

If the control dial 26 is continuously manipulated according to a user's request in the aforementioned manner, remaining third to eighth protrusion rims 56c to 56h are rotation-operated and are sequentially detached from the third to eighth catch jaws 52c to 52h formed in the third to eighth brake shoes 50c to 50h, thereby being capable of stepwise releasing restraint of the third to eighth brake shoes 50c to 50h and stepwise controlling a braking power of the spool 10.

Figure 11:
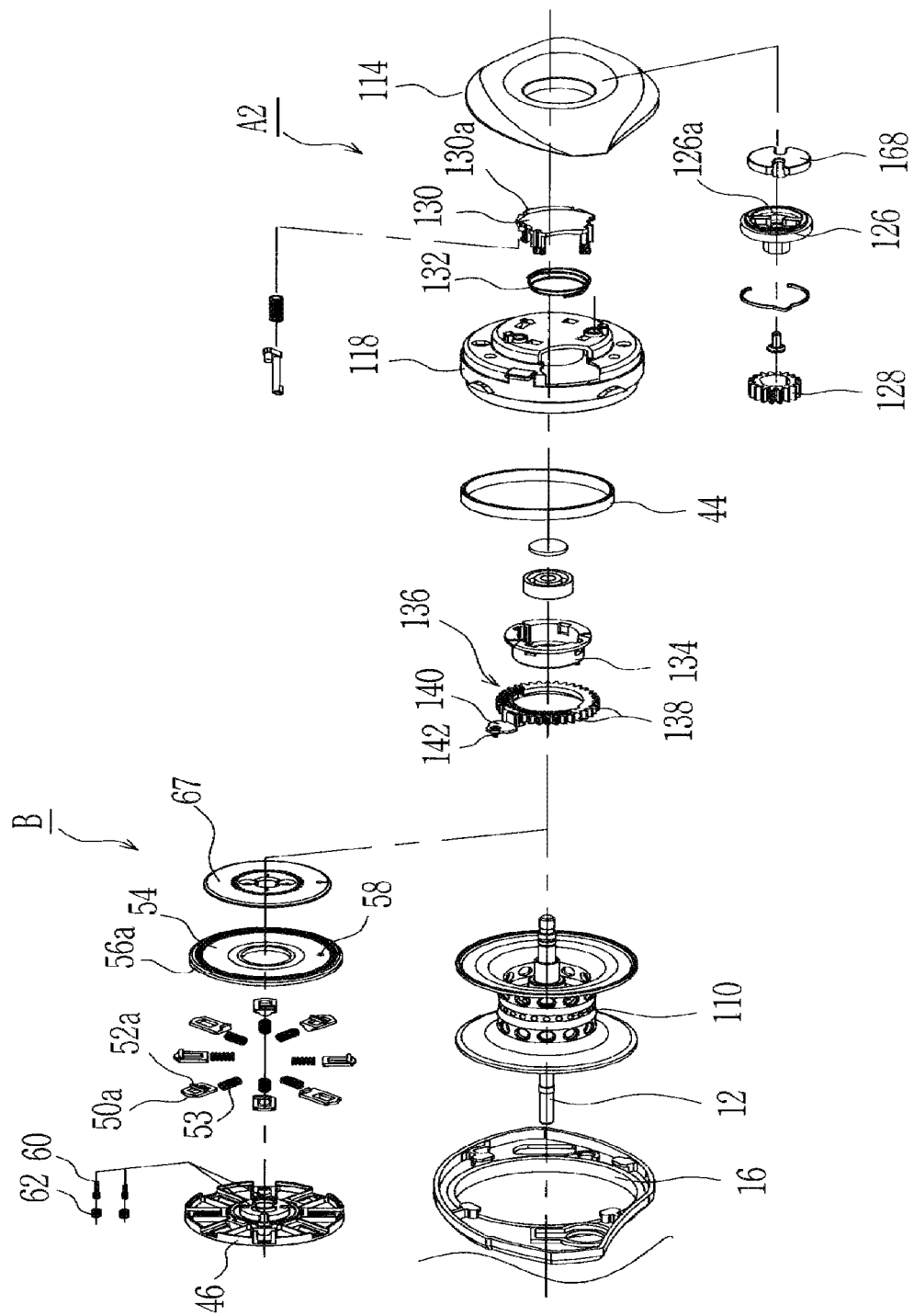
FIG. 11 is a diagram three-dimensionally illustrating a construction of a backlash prevention apparatus for a bait reel according to a second exemplary embodiment of the present utility model.
Figure 12:
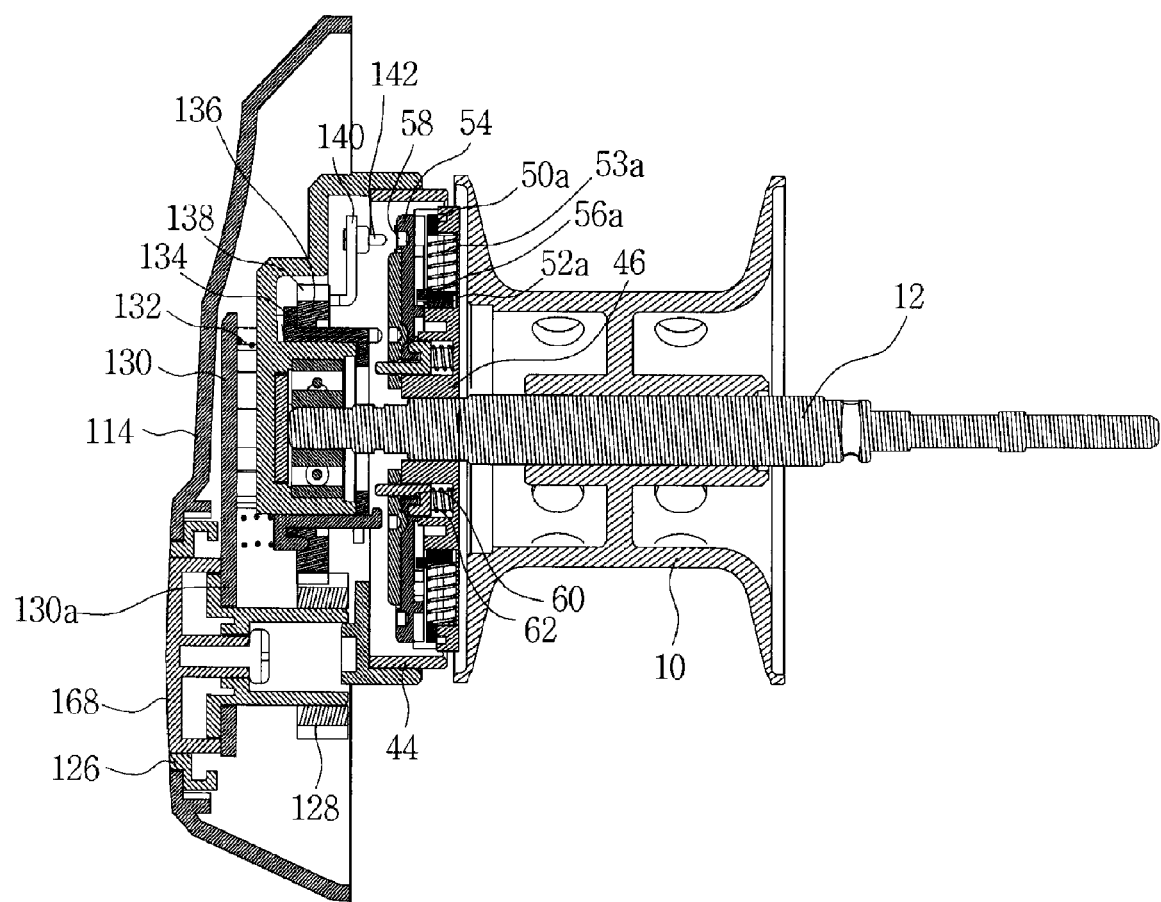
FIG. 12 is a diagram illustrating a section of an assembly construction of the backlash prevention apparatus for the bait reel shown in FIG. 11.
Figure 13:
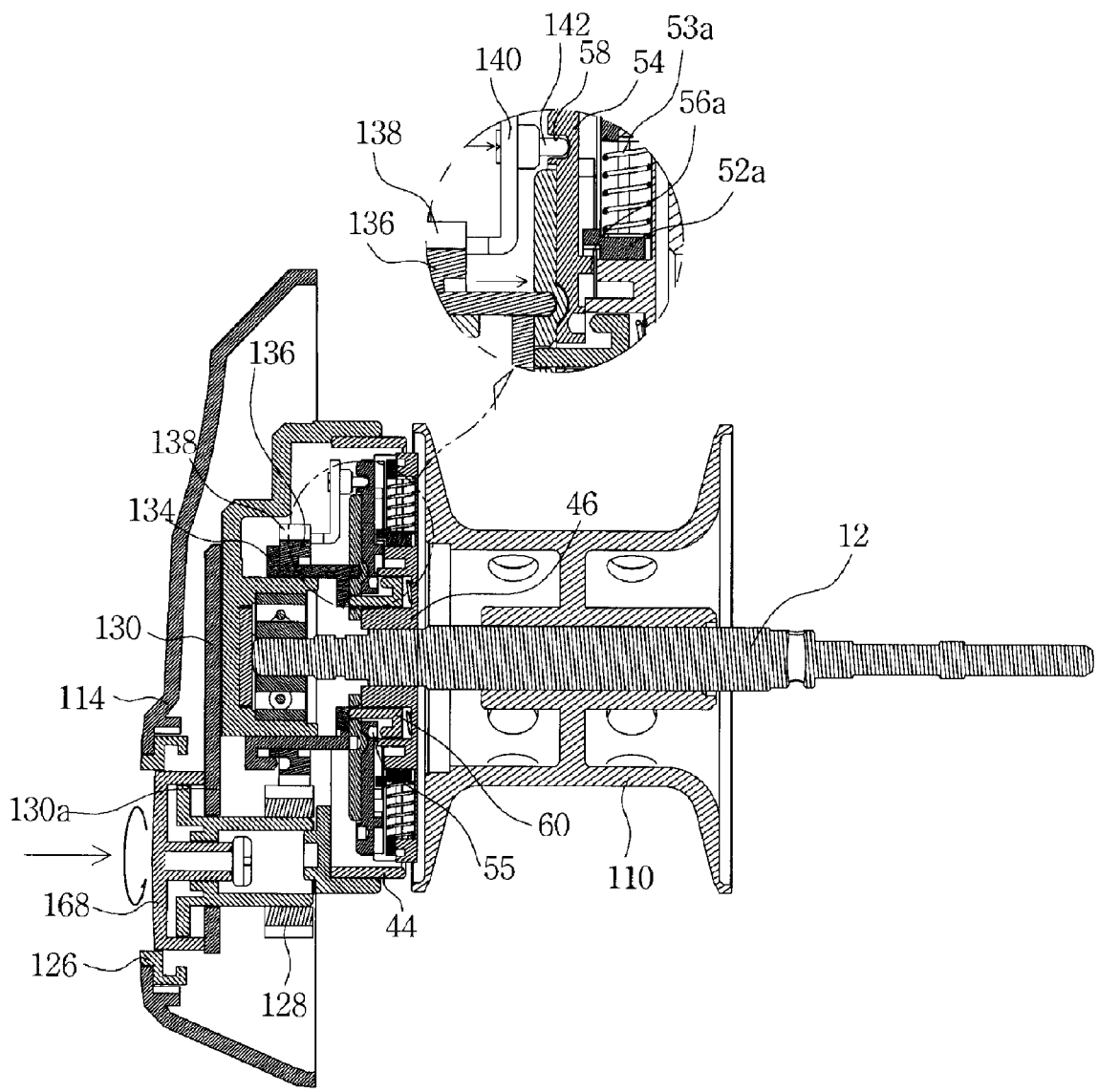
FIG. 13 is a diagram illustrating an operation state of a manipulation means constituting the backlash prevention apparatus for the bait reel shown in FIG. 12.

Meantime, FIGS. 11 to 13 attached are diagrams illustrating a second exemplary embodiment of a backlash prevention apparatus for a bait reel of the present utility model.

As illustrated, the backlash prevention apparatus for the bait reel according to the second exemplary embodiment of the present utility model is constructed by a manipulation means and a braking means as in the aforementioned first exemplary embodiment, and is characterized in that the manipulation means is constructed not to operate the braking means by a rotation operation of a control dial but to stepwise control a braking power of the braking means by a press operation of a press button in a state of exposition-constructing the control dial on a side cover.

The manipulation means (A2) according to the second exemplary embodiment includes a control dial 126, a cap holder 130, a press button 168, and a plate holder 136.

The control dial 126 is a means rotatably fitted into a coupling hole 114a formed at one side of a side cover 114 and stepwise controlling the braking means (B) that controls a rotation of the spool 110. A hole 126a into which a press button 168 is fitted is through-formed at a center of the control dial 126. Also, a dial gear 128 is coupled to an outer diameter of the control dial 126. The dial gear 128 is engaged with a ring gear 138 formed on an outer circumference surface of the plate holder 136 and delivers a rotary force of the control dial 126 to the plate holder 136.

The cap holder 130 is coupled to a cap 134 fitted to a center of the plate holder 136 in a state of passing through a spool cover 118 installed between the spool 110 and the side cover 114.

A flat part 130a is extension-formed at one side of the cap holder 130. The flat part 130a delivers a press pressure of a press button 168 to the cap holder 130 in a state of being contact-constructed to one surface of the press button 168. Accordingly, the cap holder 130 moves the cap 134 and the plate holder 136 in one direction depending on a press pressure of the press button 168 through the flat part 130*a*.

A spring 132 is installed between the cap holder 130 and the cap 134. The spring 132 restores the cap holder 130, the cap 134, and the plate holder 136 to the original state at the same time of press release of the press button 168.

The press button 168 rotation-drives the control dial 126 in a state of being fitted into the hole 126*a* of the control dial 126 and also, is contact-constructed to the flat part 130*a* of the cap holder 130 and presses the flat part 130*a* of the cap holder 130 by an external force operating, thus pressurizing the cap holder 130.

The plate holder 136 receives a delivery of a rotary force of the control dial 126 and stepwise rotates a brake shoe dial 54 that is the braking means (B).

A combination structure between the plate holder 136 and the control dial 126 is constructed to deliver the rotary force of the control dial 126 to the plate holder 136 by coupling the dial gear 128 to an outer diameter of the control dial 126 and engaging the ring gear 138 and the dial gear 128 with each other in a state of integrally forming the ring gear 138 on an outer circumference surface of the plate holder 136.

An arm 140 is extension-formed on an outer surface of the plate holder 136, and a pin 142 is coupled to an end of the arm 140. The pin 142 is fitted into a groove 58 depression-formed on one side outer surface of the brake shoe dial 154 constituting the braking means (B) and stepwise rotates the brake shoe dial 54 according to a rotation of the plate holder 136. The pin 42 is not in a state of being always fitted into the groove 58 of the brake shoe holder 54 but is constructed to be selectively fitted into the groove 58 of the brake shoe dial 54 only when the plate holder 136 moves to one side by a press pressure of the press jaw 1 68 pressing the cap holder 130.

Construction is such that one end of a stopper 66 is coupled to one side of the plate holder 136 and the other end of the stopper 66 presses a brake holder cover 67 described later according to one side direction movement of the plate holder 136. At this time, the one end of the stopper 66 is constructed to be detached from the plate holder 136 at the same time of a movement of the plate holder 136. Also, a spring 65 is installed between the stopper 66 and the control dial 126 to elastically support a movement of the stopper 66.

Meantime, the braking means (B) is a means for stepwise generating a braking power depending on a control operation of the manipulation means (A1). A technology related with this braking means (B) manufactures the same construction as that of the braking means (B) of the aforementioned first exemplary embodiment and thus, its detailed description is omitted.

Figure 14:
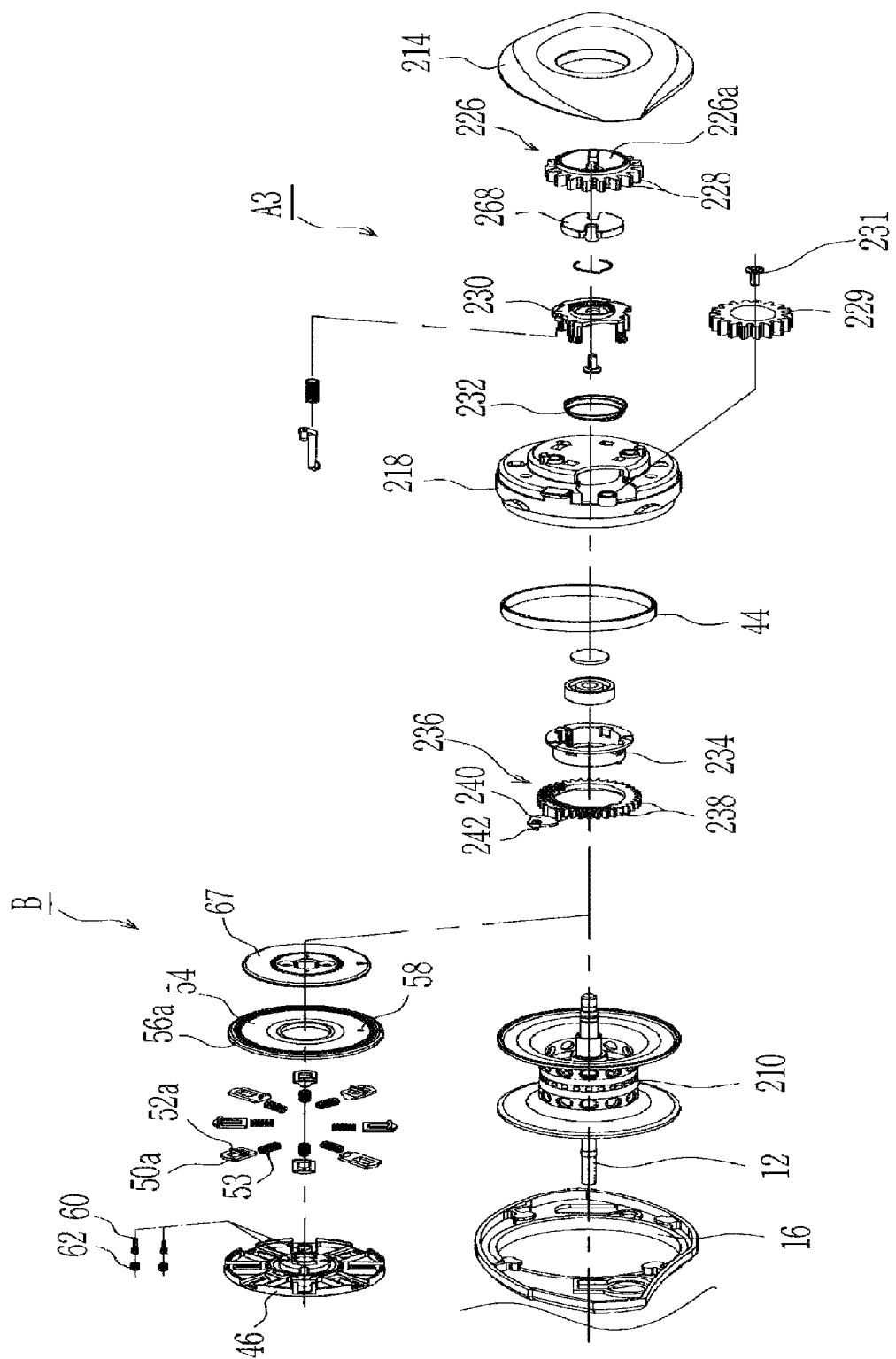
FIG. 14 is a diagram three-dimensionally illustrating a construction of a backlash prevention apparatus for a bait reel according to a third exemplary embodiment of the present utility model.
Figure 15:
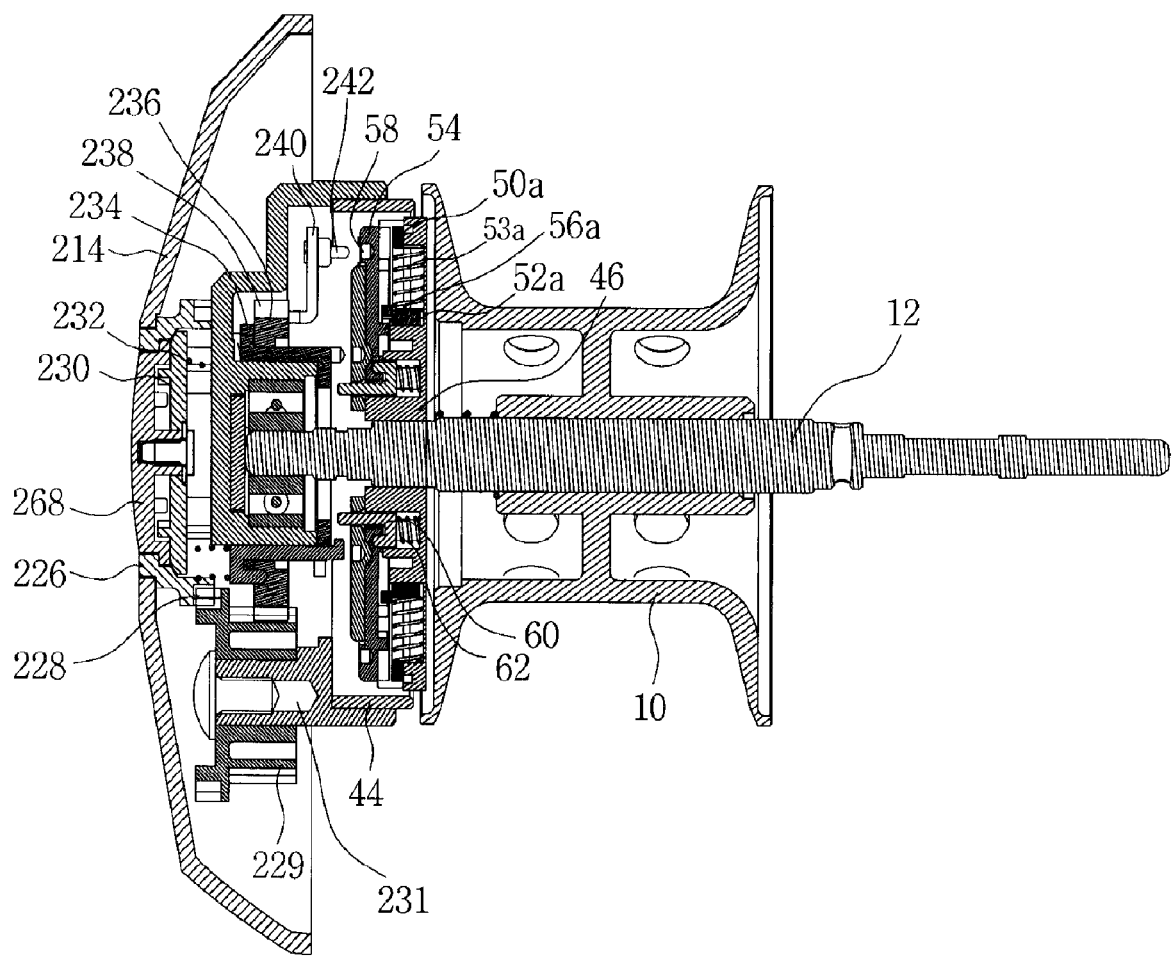
FIG. 15 is a diagram illustrating a section of an assembly construction of the backlash prevention apparatus for the bait reel shown in FIG. 13.
Figure 16:
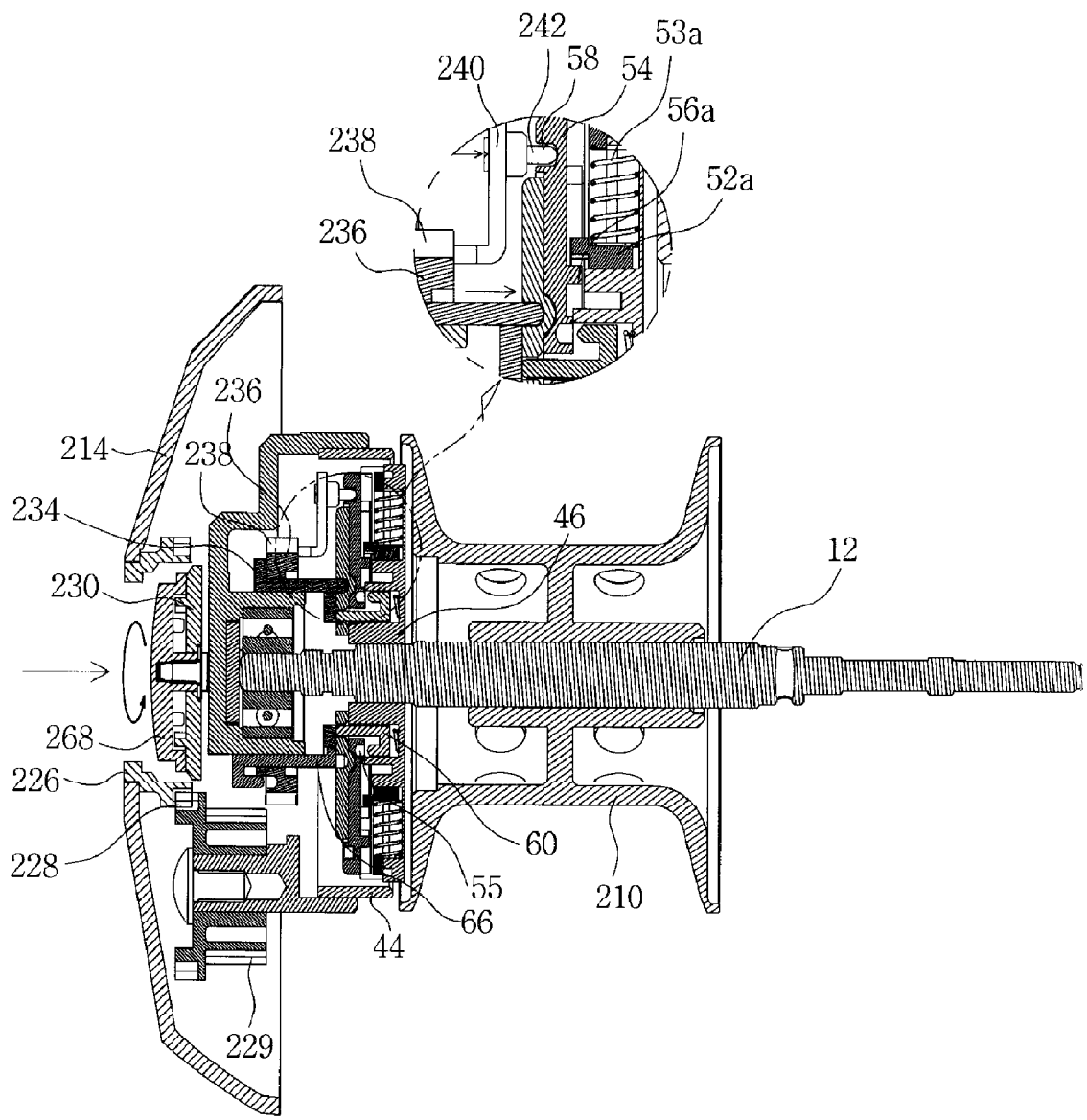
FIG. 16 is a diagram illustrating an operation state of a manipulation means constituting the backlash prevention apparatus for the bait reel shown in FIG. 15.

Meantime, FIGS. 14 to 16 attached are diagrams illustrating a construction of a backlash prevention apparatus for a bait reel according to a third exemplary embodiment of the present utility model.

As illustrated, the backlash prevention apparatus for the bait reel according to the third exemplary embodiment of the present utility model is constructed by a manipulation means (A3) and a braking means (B) as in the aforementioned first exemplary embodiment, and is characterized in that the manipulation means (A3) is constructed not to operate the braking means (B) by an operation of pushing a control dial 226 to one side by a press operation of a dial cover 20 but to stepwise control a braking power of the braking means (B) by a press operation of a press button 268 in a state of exposition-constructing the control dial 226 on a side cover 214 without including the dial cover 20. Also, the control dial 226 described in the third exemplary embodiment is characterized in that it is constructed not to be eccentrically installed at one side of the side cover 214 as in the aforementioned second exemplary embodiment but to be installed at a center of the side cover 214.

The manipulation means (A3) of the third exemplary embodiment includes the control dial 226, a cap holder 230, the press button 268, and a plate holder 236.

The control dial 226 is a means rotatably fitted into a coupling hole 214*a* of the side cover 214 and stepwise controlling the braking means (B) that controls a rotation of the spool 210. A hole 226*a* into which the press button 268 is fitted is through-formed at a center of the control dial 226.

A dial gear 228 is coupled to an outer diameter of the control dial 226. A connection gear 229 coupling-fixed to an outer diameter of a shaft 231 installed on an outer surface of one surface of the braking ring 44 that is the braking means (B) is engaged with the dial gear 228. The connection gear 229 is constructed to be engaged with the ring gear 238 formed at an outer circumference surface of the plate holder 236, thus delivering a rotary force of the control dial 226 to the plate holder 236.

The cap holder 230 is coupled to the cap 234 fitted to a center of the plate holder 236 in a state of passing through a spool cover 218 installed between the spool 210 and the side cover 214. The cap holder 230 is pushed by a press pressure of the press button 268 in a state of being positioned at one surface of the press button 268 and moves the cap 234 and the plate holder 236 in one side direction. A spring 232 is installed between the cap holder 230 and the cap 234. The spring 232 restores the cap holder 230, the cap 234, and the plate holder 236 to the original state at the same time of press release of the press button 268.

The press button 268 is positioned and constructed interposing a spring 232 at one surface of the cap holder 230 in a state of being fitted into the hole 226*a* of the control dial 226, and presses and pressurizes the cap holder 230 by an external force acting.

The plate holder 236 receives a delivery of a rotary force of the control dial 226 and stepwise rotates a brake shoe dial 54 that is the braking means (B).

A combination structure between the plate holder 236 and the control dial 226 is constructed to deliver a rotary force of the control dial 226 to the plate holder 236 by engaging the ring gear 238 formed on an outer circumference surface of the plate holder 236 to the connection gear 229 being in engagement with the dial gear 228 coupled to the control dial 226.

An arm 240 is extension-formed at an outer surface of the plate holder 236. A pin 242 is coupled to an end of the arm 240. The pin 242 is fitted into a groove 58 depression-formed at one side outer surface of the brake shoe dial 54 constituting the braking means (B) and stepwise rotates the brake shoe dial 54 according to a rotation of the plate holder 236. The pin 242 is not in a state of being always fitted into the groove 58 of the brake shoe dial 54 but is constructed to be selectively fitted into the groove 58 of the brake shoe dial 54 only when the plate holder 236 moves to one side by a press pressure of the press button 268 pressurizing the cap holder 230.

The braking means (B) is a means for stepwise generating a braking power depending on a control operation of the manipulation means (A3). A technology related with this braking means (B) manufactures the same construction as that of the braking means of the aforementioned first exemplary embodiment and thus, its detailed description is omitted.

A backlash prevention apparatus for a bait reel according to the utility model has an operation effect of being able to stepwise control a braking power of a spool according to a user's request by stepwise releasing restraint of first to eighth brake shoes that generate a friction force by manipulating a control dial installed in a side cover.

While the utility model has been shown and described with reference to a certain preferred embodiment thereof, it will be understood by those skilled in the art that various changes in form and details may be made therein without departing from the spirit and scope of the utility model as defined by the appended claims.

What is claimed is:

1. An externally controllable backlash prevention apparatus for a bait reel having a spool and a side cover, the apparatus comprising:
   a manipulation means installed between the spool and the side cover;
   a brake holder coupled to a shaft of the spool and receiving a delivery of a power of the manipulation means for rotation operation;
   a brake ring assembled to an outer surface of the brake holder in a state of being at a distance;
   first to eighth brake shoes installed in a state of being spread radially along one side circumference surface of the brake holder, moving in an outer direction by the centrifugal force depending on a rotation of the spool, contacting with an inner circumference surface of the brake ring, and generating a friction force;
   springs installed within the first to eighth brake shoes and restoring, by a tension force, the first to eighth brake shoes to the original state;
   first to eighth catch jaws protrusion-formed in positions different from each other on one side surfaces of the first to eighth brake shoes, respectively;
   a brake shoe dial covered with the first to eighth brake shoes and receiving a delivery of a rotary force of a plate holder for rotation-operation; and
   a braking means comprised of first to eighth protrusion rims each protrusion-formed in positions different from each other along one side circumference surface of the brake shoe dial, being sequentially detached from the first to eighth catch jaws according to rotation-driving of the brake shoe dial in a state of being each caught by outer surfaces of the first to eighth catch jaws, and stepwise releasing restraint of the first to eighth brake shoes.

2. The apparatus of claim 1, wherein a stopper caught by the brake shoe dial is coupled to the brake holder, and the stopper is pressed by the cap being in movement and is detached from the brake shoe dial.

3. The apparatus of claim 2, wherein one end of the stopper is coupled to an outside of the plate holder, the one end of the stopper is detached from the plate holder according to a movement of the plate holder in a state where the other end of the stopper is contact-constructed to a brake holder cover covering one surface of the brake holder, and the other end of the stopper is constructed to press the brake holder cover.

4. The apparatus of claim 1, wherein the manipulation means comprises:
   a dial cover hinge-coupled to one side surface of the side cover for rotation operation and protrusion-forming a press jaw on an inner surface;
   a control dial covered with the dial cover and rotatably fitted into a coupling hole formed at one side of the side cover;
   a dial gear coupled to an outer diameter of the control dial;
   a plate holder installed between the spool and the side cover, forming a ring gear engaged with the dial gear at an outer diameter, and rotation-operating by an operation of the control dial;
   a cap coupled to a center of the plate holder;
   a cap holder positioned on one surface of the cap, being pressed by the press jaw of the dial cover according to a rotation of the dial cover, and moving the cap and the plate holder in one side direction; and
   a pin provided outside of the plate holder, being fitted into a groove formed on one side outer surface of the brake shoe dial according to a movement of the plate holder, and delivering a rotary force of the plate holder to the brake shoe dial.

5. The apparatus of claim 4, wherein the press jaw has a squared sectional shape.

6. The apparatus of claim 4, wherein the press jaw has an oval sectional shape.

7. The apparatus of claim 1, wherein the manipulation means comprises:
   a control dial rotatably fitted into a coupling hole formed at an outside of the side cover, through-forming a hole at a center, and coupling-constructing a dial gear at an outer diameter;
   a press button fitted into the hole of the control dial and rotation-driving the control dial;
   a plate holder installed between the spool and the side cover, forming a ring gear engaged with the dial gear, and rotation-driving by an operation of the control dial;
   a cap coupled to a center of the plate holder;
   a cap holder positioned on one surface of the cap, extension-forming a flat part contacting with the press button at one side, and moving the cap and the plate holder in one side direction by a press pressure of the press button; and
   a pin provided outside of the plate holder, fitted into a groove formed on one side outer surface of the brake shoe dial according to a movement of the plate holder, and delivering a rotary force of the plate holder to the brake shoe dial.

8. The apparatus of claim 1, wherein the manipulation means comprises:
   a control dial rotatably fitted into a coupling hole formed at a center of the side cover, through-forming a hole at a center, and coupling-constructing a dial gear at an outer diameter;
   a press button fitted into the hole of the control dial and rotation-driving the control dial;
   a connection gear coupled to a shaft installed at one side of the brake ring and engaging with the dial gear;
   a plate holder installed between the spool and the side cover, forming a ring gear engaged with the connection gear at an outer diameter, and rotation-driving by an operation of the control dial;
   a cap coupled to a center of the plate holder;
   a cap holder positioned at one surface of the cap, and moving the cap and the plate holder in one side direction by a press pressure of the press button; and
   a pin provided outside of the plate holder, fitted into a groove formed on one side outer surface of the brake shoe dial according to a movement of the plate holder, and delivering a rotary force of the plate holder to the brake shoe dial.

* * * * *